US009418703B2

(12) United States Patent
Abbate et al.

(10) Patent No.: US 9,418,703 B2
(45) Date of Patent: Aug. 16, 2016

(54) METHOD OF AND SYSTEM FOR AUTOMATIC COMPILATION OF CROWDSOURCED DIGITAL MEDIA PRODUCTIONS

(71) Applicant: Mindset Systems, Millis, MA (US)

(72) Inventors: Mark Peter Abbate, Norfolk, MA (US); Michael Francis Conway, Chapel Hill, NC (US); Robert Earl Lamm, Brookline, MA (US); Steven Philip Nickel, Medway, MA (US)

(73) Assignee: Mindset Systems Incorporated, Millis, MA (US)

( * ) Notice: Subject to any disclaimer, the term of this patent is extended or adjusted under 35 U.S.C. 154(b) by 0 days.

(21) Appl. No.: 14/509,120

(22) Filed: Oct. 8, 2014

(65) Prior Publication Data

US 2015/0098690 A1 Apr. 9, 2015

Related U.S. Application Data

(60) Provisional application No. 61/888,745, filed on Oct. 9, 2013.

(51) Int. Cl.
*H04N 9/80* (2006.01)
*G11B 27/031* (2006.01)
(Continued)

(52) U.S. Cl.
CPC ............ *G11B 27/031* (2013.01); *H04N 9/8205* (2013.01); *H04N 21/435* (2013.01); *H04N 21/27* (2013.01); *H04N 21/8547* (2013.01)

(58) Field of Classification Search
CPC .............. H04N 9/8205; H04N 21/435; H04N 21/8547; H04B 1/202; G11B 27/031; H04L 25/40

USPC .................................................. 386/242, 248
See application file for complete search history.

(56) References Cited

U.S. PATENT DOCUMENTS 6,301,370 B1   10/2001   Steffens et al.
6,833,865 B1 *  12/2004   Fuller ............... G06F 17/30247
                                                    348/231.2

(Continued)

FOREIGN PATENT DOCUMENTS

EP            2403236 B1    12/2013

OTHER PUBLICATIONS

International Search Report and Written Opinion Issued by the U.S. Patent Office as International Searching Authority for International Application No. PCT/US14/59617 mailed Jan. 6, 2015 (17 pgs.).

*Primary Examiner* — Helen Shibru
(74) *Attorney, Agent, or Firm* — Wilmer Cutler Pickering Hale and Dorr LLP

(57) ABSTRACT

A method of and system for automatic compilation of crowdsourced digital media productions is presented. A system for automated compilation of a digital media program includes interfaces that receive audio/video information, associated temporal information, associated digital device metadata, and media characteristic preference information. The system includes a repository for the digital media input and associated digital device metadata. The system further includes a module that analyzes digital device metadata associated with individual digital media inputs from at least two different recording devices and selects between overlapping portions of the media inputs based on comparing digital device metadata associated with the individual digital media inputs with the media characteristic preference information. The system also includes a digital media editor module that compiles the selected portions of the individual digital media inputs into a digital media program and an output interface that provides access to the digital media program.

22 Claims, 16 Drawing Sheets

(51) Int. Cl.
*H04N 21/435* (2011.01)
*H04N 9/82* (2006.01)
H04N 21/27 (2011.01)
H04N 21/8547 (2011.01)

(56) References Cited

U.S. PATENT DOCUMENTS

| | | |
|---|---|---|
| 7,929,012 B2 | 4/2011 | Fry et al. |
| 8,006,189 B2 | 8/2011 | Dachs |
| 8,009,193 B2 | 8/2011 | Zhou et al. |
| 8,108,541 B2 | 1/2012 | Shamilian et al. |
| 8,260,117 B1 | 9/2012 | Xu et al. |
| 8,290,999 B2 | 10/2012 | Shepherd et al. |
| 8,296,810 B1 | 10/2012 | Everson et al. |
| 8,335,526 B2 | 12/2012 | Shankaranarayanan et al. |
| 8,352,513 B2 | 1/2013 | Arrouye et al. |
| 8,359,643 B2 | 1/2013 | Low et al. |
| 8,369,570 B2 | 2/2013 | Myers et al. |
| 8,390,743 B2 | 3/2013 | Cheng et al. |
| 8,391,774 B2 | 3/2013 | Arseneau et al. |
| 8,392,530 B1 | 3/2013 | Manapragada et al. |
| 8,407,223 B2 | 3/2013 | Guralnik et al. |
| 8,437,500 B1* | 5/2013 | Bosworth ........... G06F 17/3079 382/100 |
| 8,442,265 B1 | 5/2013 | Bosworth et al. |
| 8,768,748 B2* | 7/2014 | Shafiee ............ G06Q 10/06311 705/400 |
| 9,111,579 B2* | 8/2015 | Meaney ............... G11B 27/031 |
| 9,129,640 B2* | 9/2015 | Hamer ................ G11B 27/034 |
| 9,158,974 B1* | 10/2015 | Laska .................. G06K 9/6267 |
| 9,195,679 B1* | 11/2015 | Svendsen .......... G06F 17/30268 |
| 9,269,007 B2* | 2/2016 | Iguchi ................ G06K 9/00832 |
| 2002/0105598 A1 | 8/2002 | Tai et al. |
| 2002/0116392 A1 | 8/2002 | McGrath et al. |
| 2002/0199198 A1* | 12/2002 | Stonedahl .......... G06Q 30/0601 725/86 |
| 2003/0194211 A1* | 10/2003 | Abecassis .............. G11B 19/02 386/234 |
| 2004/0085341 A1 | 5/2004 | Hua et al. |
| 2005/0086687 A1* | 4/2005 | Omoigui ................ H04H 60/33 725/35 |
| 2005/0193421 A1 | 9/2005 | Cragun |
| 2006/0156246 A1 | 7/2006 | Williams et al. |
| 2006/0179453 A1 | 8/2006 | Kadie et al. |
| 2006/0251382 A1 | 11/2006 | Vronay et al. |
| 2006/0251384 A1 | 11/2006 | Vronay et al. |
| 2006/0256200 A1 | 11/2006 | Matei et al. |
| 2007/0008131 A1* | 1/2007 | Doan ...................... G06F 21/35 340/572.1 |
| 2007/0043748 A1 | 2/2007 | Bhalotia et al. |
| 2007/0050828 A1 | 3/2007 | Renzi et al. |
| 2007/0106551 A1 | 5/2007 | McGucken |
| 2007/0239538 A1 | 10/2007 | Misra |
| 2007/0266252 A1 | 11/2007 | Davis et al. |
| 2008/0059522 A1 | 3/2008 | Li et al. |
| 2008/0088698 A1 | 4/2008 | Patel et al. |
| 2008/0126109 A1 | 5/2008 | Cragun et al. |
| 2008/0172704 A1 | 7/2008 | Montazemi |
| 2008/0184245 A1 | 7/2008 | St-Jean |
| 2008/0242221 A1 | 10/2008 | Shapiro et al. |
| 2008/0263450 A1 | 10/2008 | Hodges et al. |
| 2008/0266385 A1 | 10/2008 | Smith et al. |
| 2009/0074261 A1 | 3/2009 | Haupt et al. |
| 2009/0087161 A1 | 4/2009 | Roberts et al. |
| 2009/0119369 A1 | 5/2009 | Chou |
| 2009/0161994 A1 | 6/2009 | Sauerwein, Jr. et al. |
| 2009/0196570 A1 | 8/2009 | Dudas et al. |
| 2009/0290755 A1 | 11/2009 | Ma et al. |
| 2009/0292549 A1 | 11/2009 | Ma et al. |
| 2010/0011135 A1 | 1/2010 | Jawa et al. |
| 2010/0023863 A1 | 1/2010 | Cohen-Martin |
| 2010/0118941 A1 | 5/2010 | Taylor et al. |
| 2010/0161761 A1 | 6/2010 | Yu et al. |
| 2010/0202751 A1 | 8/2010 | Doffing et al. |
| 2011/0093466 A1 | 4/2011 | Kim et al. |
| 2011/0142420 A1 | 6/2011 | Singer |
| 2011/0145257 A1 | 6/2011 | McDonald et al. |
| 2011/0164105 A1 | 7/2011 | Lee et al. |
| 2011/0184964 A1 | 7/2011 | Li |
| 2011/0231515 A1 | 9/2011 | Day et al. |
| 2011/0292244 A1 | 12/2011 | Deever |
| 2011/0302605 A1 | 12/2011 | Ramaswamy et al. |
| 2012/0016965 A1 | 1/2012 | Chen et al. |
| 2012/0026406 A1 | 2/2012 | Takakusaki |
| 2012/0060077 A1 | 3/2012 | Mate et al. |
| 2012/0127977 A1 | 5/2012 | Copeland et al. |
| 2012/0150953 A1 | 6/2012 | Costanzo et al. |
| 2012/0195363 A1 | 8/2012 | Laganiere et al. |
| 2012/0198317 A1 | 8/2012 | Eppolito et al. |
| 2012/0198500 A1 | 8/2012 | Sheeley |
| 2012/0236005 A1 | 9/2012 | Clifton et al. |
| 2012/0263439 A1 | 10/2012 | Lassman et al. |
| 2012/0272126 A1 | 10/2012 | Atkins et al. |
| 2012/0308209 A1 | 12/2012 | Zaletel |
| 2013/0012271 A1 | 1/2013 | Chi et al. |
| 2013/0013679 A1 | 1/2013 | Lahartinger |
| 2013/0018881 A1 | 1/2013 | Bhatt |
| 2013/0024476 A9 | 1/2013 | Hodgkinson et al. |
| 2013/0030987 A1 | 1/2013 | Zuckerberg et al. |
| 2013/0094591 A1 | 4/2013 | Laksono et al. |
| 2013/0094698 A1 | 4/2013 | Laksono et al. |
| 2013/0094834 A1 | 4/2013 | Laksono et al. |
| 2013/0104238 A1 | 4/2013 | Balsan et al. |
| 2013/0111051 A1 | 5/2013 | Yaron et al. |
| 2013/0117792 A1 | 5/2013 | Khouzam et al. |
| 2013/0138438 A1 | 5/2013 | Bachtiger et al. |

\* cited by examiner

METHOD OF AND SYSTEM FOR AUTOMATIC COMPILATION OF CROWDSOURCED DIGITAL MEDIA PRODUCTIONS

CROSS-REFERENCE TO RELATED APPLICATIONS

This application claims the benefit under 35 U.S.C. §119(e) of U.S. Provisional Patent Application No. 61/888,745, entitled, "Method of and System for Automatic Compilation of Crowdsourced Video Production," filed Oct. 9, 2013, the contents of which are incorporated by reference herein.

BACKGROUND OF THE INVENTION

1. Field of the Invention

The present invention relates to mobile digital media production, cloud based data processing, and digital media delivery, and, more specifically, to automatically editing and assembling digital media into digital media programs by processing, analyzing, and ranking device sensor information and viewer provided parameters.

2. Background of the Invention

Evolutionary advances in the capabilities of video capture devices are fueling a new paradigm regarding how personal spectator media is acquired, saved, and shared. These "smart" devices have become pervasive and inexpensive; their video capture capabilities have approached or exceeded the quality levels of single-purpose portable video cameras.

"Smart" devices are deployed with connectivity features that allow them to offload captured audio and/or video (AV) streams. Many are programmable in a limited fashion. Moreover, many of these devices have a collection of sensors providing additional information about location, orientation, and motion of the device. Examples of such "smart" devices include video cameras, cell phones, smart phones, tablets, laptops, and wearable computers, but also may include devices loosely formed by augmenting a video capture device with additional capabilities via attached external packages, such as medical devices, unmanned aerial vehicles (for news gathering or surveillance), inspection robotics, and industrial monitoring equipment.

Applicants have found that collaborations between individuals capturing video segments of an event offer an opportunity for enhanced coverage of the event including an extended time-line, multiple points-of-view of a subject, and/or simultaneous/overlapping coverage of different subjects. Currently collaborations are informal; as the number of collaborators increases so does the burden of oversight by those interested in acquiring access to the recordings to ensure their timely acquisition/dissemination.

Further still, once the original recordings have been acquired, familiarity and skill with one or more digital media editing tools is required to further reduce/aggregate the collected recordings of the event to one or more digital media productions reflecting the editor's interests and preferences. Manually controlled editing systems allow the editor to inspect the recording's audio and video content and choose the best content for any defined time period. This is an artistic and highly subjective process.

SUMMARY OF THE INVENTION

Under one aspect of the invention, methods of and systems for automatic compilation of crowdsourced video productions is presented.

Under another aspect of the invention, a system for analysis of individual digital media inputs and automated compilation of a digital media program includes a digital media interface that receives an individual digital media input. The individual digital media input includes at least one of audio and video information and associated temporal information captured by a recording device. The system also includes a metadata interface that receives digital device metadata associated with the individual digital media input. The digital metadata includes at least (i) information derived from at least one sensor of the recording device that characterizes a physical attribute of the recording device at the time said recording device captured the individual digital media input and (ii) information temporally associating the sensor data with the individual digital media input. The system also includes a source data repository that stores the information of the individual digital media input and associated digital device metadata and a preference interface that receives media characteristic preference information. The system further includes a metadata analyzer module that analyzes digital device metadata associated with individual digital media inputs from at least two different recording devices. The digital media inputs have at least one temporally overlapping portion, and the metadata analyzer module selects between the overlapping portions based on comparing digital device metadata associated with the individual digital media inputs with the media characteristic preference information. The system also includes a digital media editor module that compiles the selected portions of the individual digital media inputs into a digital media program and an output interface that provides access to the digital media program.

In an embodiment, an automated mechanism installed on a recording device captures a stream of periodic sensor observations coincident with capturing AV streams. The temporal relationship of the content in these AV and sensor streams is maintained through information embedded in each reflecting a common reference clock, the latter synchronized with an accurate time source, e.g. network time or GPS services, following power-up and prior to initiating the recording process.

A further embodiment incorporates one or more client mechanisms inter-operating with services supporting an event occurring at the time and location the streams were or are being captured. One client utilizes services to synchronize its local reference clock with an accurate time source associated with the event time-line. Another client utilizes services that facilitate the propagation of streams captured at the event into an associated common repository.

In another embodiment, each AV and sensor stream submitted to the repository undergoes processing to extract, organize and preserve metadata. The aggregation of metadata is later utilized by a mechanism employing predetermined digital media program templates, style and filter algorithms to identify, isolate and assemble portions of the submitted AV streams to create a digital media program for the event. This media program is dynamic in the sense that the selected content may change as more streams are submitted to the repository.

In still another embodiment, the identification of content, types of transitions employed, etc. are guided by parameters supplied by a viewer, allowing each viewer to create a tailored media program which better reflects that viewer's preferences.

In still another embodiment, advertising content is included in the media program, the content selected by the locations and social relations of the viewer and/or contributors.

Further aspects of the invention include systems for and methods of automatically assembling digital media programs from a collection of contributed AV streams and available advertising content, as well as systems for and methods of periodically observing available sensors on a "smart" video capture device coincident with the capture of AV streams therein, collecting these observations into a stream via a protocol, and associating the collected sensor observations with the captured AV streams via a common timeline established utilizing a singular reference clock.

Still further aspects of the invention include a singular Reference Clock on a "smart" video capture device in which the clock provides a common timeline between sequences of AV frames and sequences of sensor observations captured concurrently on the device. Optionally, a component to acquire date/time and timecode values from the Reference Clock and to directly or indirectly cause those values to be embedded into AV streams captured on the aforementioned device is included. Another optional feature includes a component to periodically acquire a timestamp from the Reference Clock and to associate that value with the set of observations subsequently obtained from sensors on the aforementioned device through the interfaces supplied. Still further optional features include a protocol for the storage and/or transmission of a sensor data stream composed of a sequence of time stamped sensor observations as well as a component to organize the collection of time stamped sets of sensor observations into the aforementioned sensor stream in accordance with the aforementioned protocol.

Other aspects of the invention include techniques for maintaining entities to facilitate an event-venue-reservation system for the purposes of collecting and disseminating AV and sensor streams contributed by attendees of an event using "smart" video capture devices. Such aspects optionally include a mechanism establishing services for creating and maintaining events, for browsing and selecting events, and for facilitating the upload and download of AV streams (including associated sensor data, when available) to/from the repository associated with a selected event. These services include, but are not limited to, facilitating the synchronization of the local reference clock on a "smart" video capture device to the time-line associated with a specific event, and establishing a convention for determining "record transition" points at well-defined intervals along a specific event time-line, originating at the beginning of the event time-line and recurring at intervals derived from the frames-per-second value of the pending video recording. An extension of the mechanism with services can optionally include (i) creating and maintaining venues (a defined space) and for browsing and selecting venues, (ii) creating and maintaining reservations (a time during which an event occurs at a venue), and for browsing and selecting reservations, and (iii) establishing services for creating and maintaining viewer profiles (a collection of viewer provided parameters).

Still other aspects of the invention include techniques for processing a collection of associated AV and sensor streams for the purpose of generating and maintaining catalogs of AV sequences with metadata, the latter organized and preserved in a format whereby it is readily accessible for query and annotation. Optionally, these techniques include analyzing an AV stream and its associated sensor stream acquired using a "smart" video capture device to subsequently generate, update, and maintain one or more sets of metadata for that singular association, such metadata to include parameters associated with the AV and sensor streams in their entirety as well as parameters associated with sequences of video frames within the associated streams. Further still, optional implementations can include technique for processing a collection of AV streams and their associated sensor streams either serially or in parallel, the membership of said collection determined by an external relationship, and to generate, update, and maintain one or more sets of metadata supporting the external relationship.

Another aspect of the invention includes techniques for selecting AV sequences conforming to a set of viewer provided parameters and/or processing-dependent parameters by querying the metadata within a catalog. Viewer provided parameters may be selected directly by the viewer (active, a priori) or may be deduced from the viewer's feedback (active/passive, a posteriori) in iterative methods.

Still a further aspect of the invention includes techniques for automatically selecting advertisements during the assembly process of digital media programs by utilizing user profiles including, but not limited to a priori information of geography and social relations between digital media source contributors and viewers.

An aspect of the invention includes systems for and methods of automatically extracting selected AV sequences and assembling these together with selected advertisements into digital media programs.

Another aspect of the invention includes methods for accessing a source data repository using a computing device comprising one or more programmable processors, extracting segments of one or more AV Files and one or more associated sensor Meta Files using a computing device, and analyzing viewer provided parameters using a computing device. The method also includes analyzing specific time ranges and values as a subset of the array of time correlated data using a computing device, determining the criteria to be used to provide a rank of AV files using a computing device, incorporating preset patterns, sequences, and templates to improve the viewing quality and viewer enjoyment of the digital media program using a computing device, and determining the best AV file or segment of AV file to be included in a digital media program for any specified time period using a computing device.

In still another aspect of the invention, a system includes (i) a digital media processing system that includes a plurality of users, user owned devices, and at least one viewer capable of viewing a digital media program and providing inputs in the form of settings or controls, (ii) at least one collection module providing a Source Data Repository, (iii) at least one programmable processor for performing the functions of a Meta Processor, (iv) at least one programmable processor for performing the functions of a Digital Media Editor, (v) optionally including executable instructions to extract relevant information from Meta Files, and (vi) optionally including executable instructions to analyze the extracted information in the context of the know how to create digital media programs whereby selecting the best choice AV File or portion of AV file to incorporate into the digital media program.

A further aspect of the invention includes systems and methods for automatically editing and assembling digital media into digital media programs by utilizing user profiles including, but not limited to a priori information of social relations between source contributors and viewers.

Yet another aspect of the invention includes systems and methods for automatically inserting advertisements into digital media compilations by utilizing user profiles including, but not limited to a priori information of geography, social relations between digital media source contributors and viewers, and inserting the advertisements at strategic points in time (i.e., one that is pre-planned or is void of contributed digital media AV files) which benefit from a filler segment of an AV file in the form of a commercial product advertisement, information commercials, public service announcements, or a general announcement about the status of the program or its participants.

Another aspect of the invention includes systems for and methods of automatically triggering re-creation/re-assembly of a digital media program through monitoring changes to its input conditions.

Any of the aspects, embodiments, or implementations disclosed herein can be combined with any other aspect, embodiment, or implementation.

BRIEF DESCRIPTIONS OF DRAWINGS

The following drawings illustrate some embodiments of the present invention and therefore do not limit the scope of the invention. The drawings are intended for use in conjunction with the explanations in the following detailed description section.

DETAILED DESCRIPTION

Figure 1:
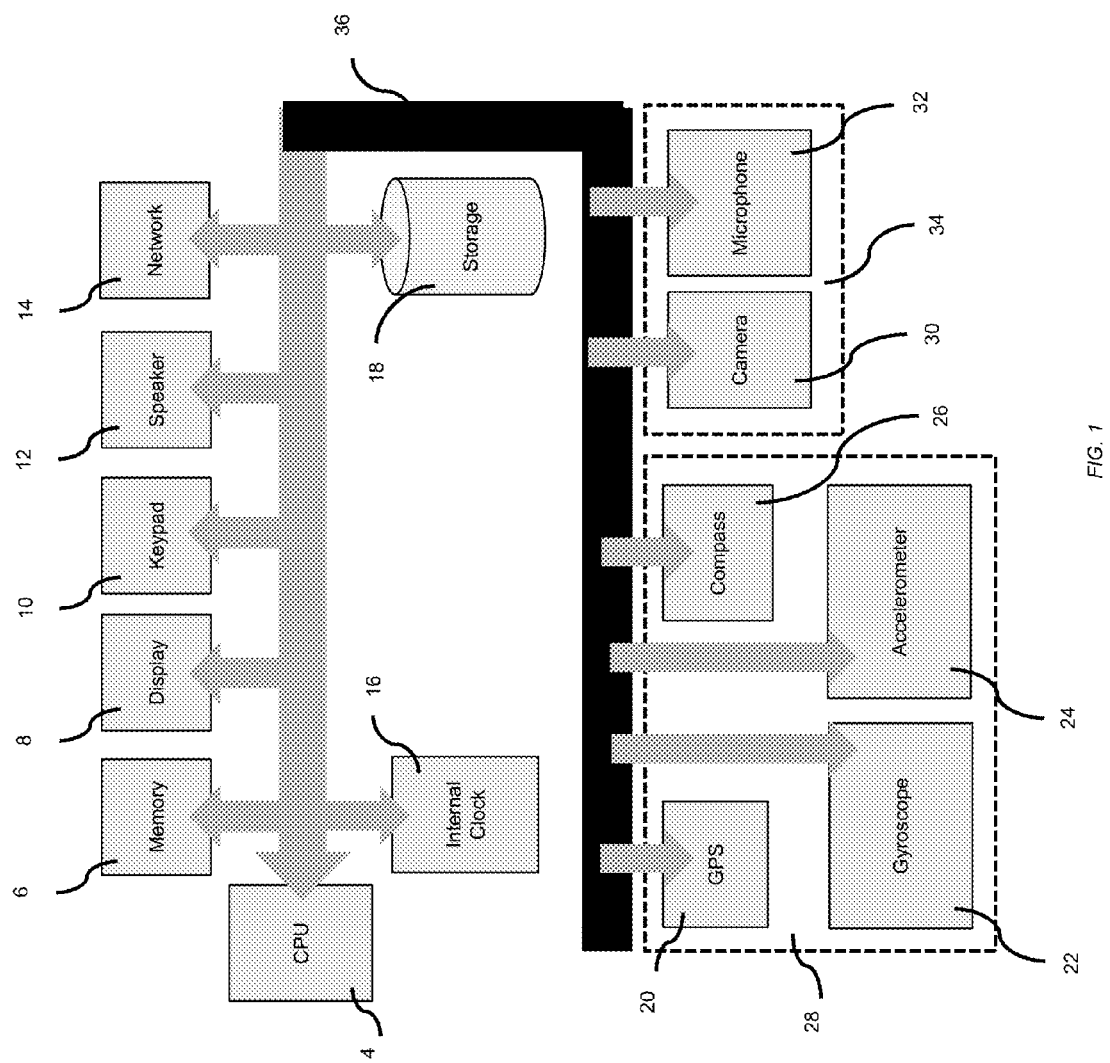
FIG. 1 is an interconnection diagram that may be used according to an embodiment of the invention.

FIG. 1 shows a referential model illustrating one example of a "smart" video capture device. The device consists of a CPU 4, Memory 6, and Clock 16 attached to a Bus 36, with access to a Display 8, a Keypad 10, a Speaker 12, a Network interface 14, and a persistent Storage device 18 via the same Bus 36. Similarly accessible are a Camera 30 and Microphone 32 which together comprise the AV Acquisition package 34, and a GPS 20, a Gyroscope 22, an Accelerometer 24 and a Compass 26 which together comprise the Sensor package 28.

This configuration is but one example of packaging existing technologies and is not intended to be limiting; other capabilities may be present in different embodiments and/or may be organized as disparate entities inter-operating across external buses and/or networks.

Figure 2:
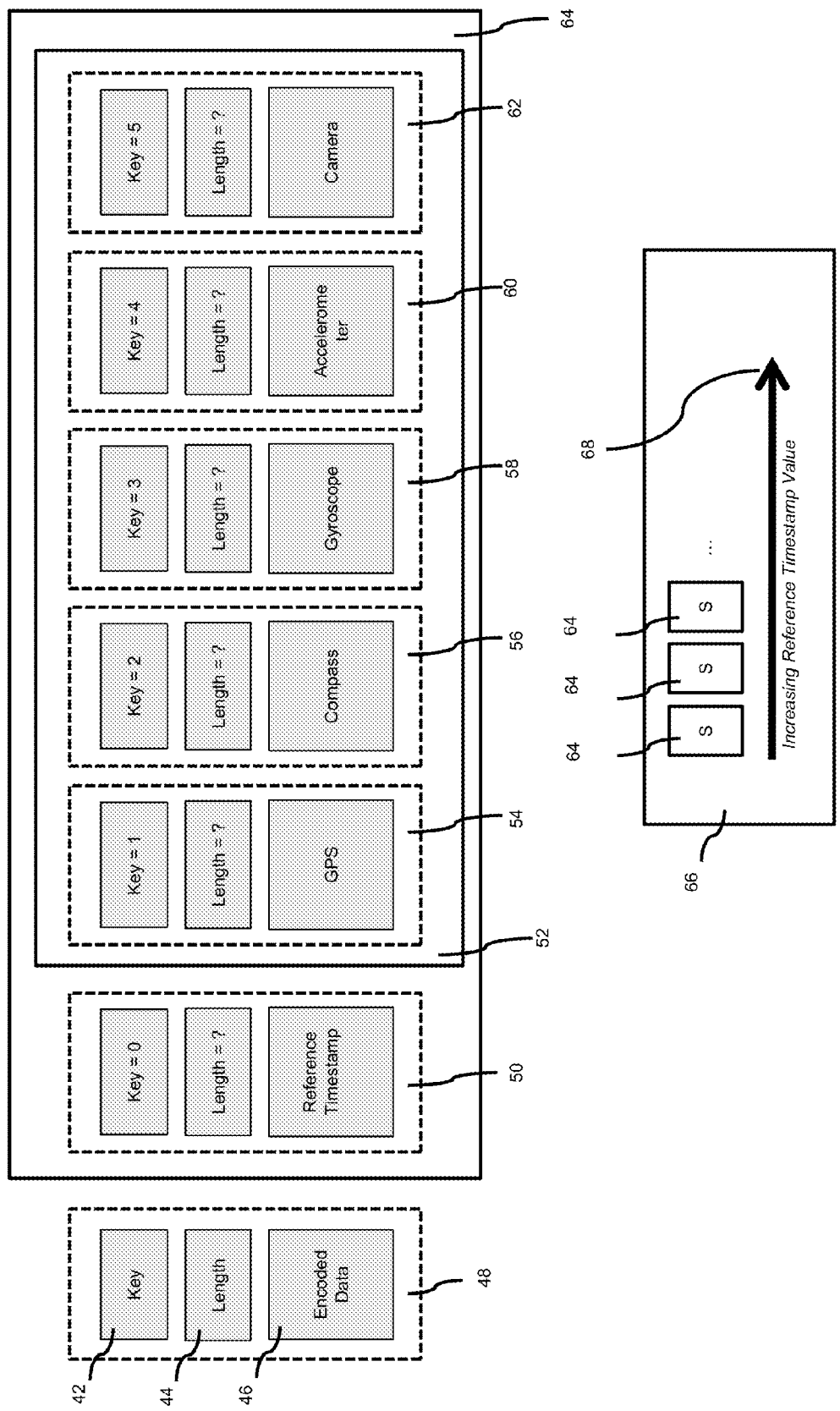
FIG. 2 is a block diagram to show data structure that may be used according to an embodiment of the invention.

FIG. 2 shows a graphical representation of the Sensor Stream Protocol 66, defined as a sequence of Sensor Sample Sets 64. Each Sample Set is comprised of Sensor Values; the first Sensor Value 50 in every Sample Set holds the Reference Timestamp value obtained from the Reference Clock 86, while the remaining Sensor Values 52 in the Sample Set hold one or more values for each sensor sampled at the time associated with the preceding Reference Timestamp value.

All Sensor Values are encoded as (Key, Length, Value) triplets 48 to maintain the integrity of the Sensor Stream Protocol in the presence of unrecognized Key values. The Key value identifies both the associated sensor and the format of the Value; the Value holds the formatted observed values for the associated sensor; the Length supplies the number of octets comprising the Value.

Figure 3:
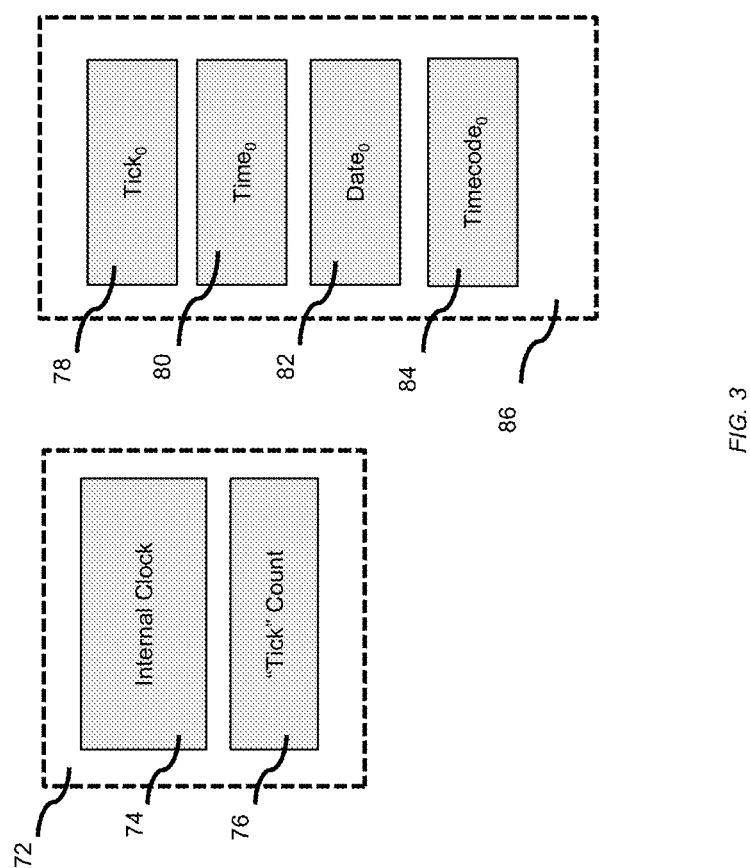
FIG. 3 is a block diagram to show data structure that may be used according to an embodiment of the invention.

FIG. 3 provides a graphical representation of the Reference Clock 86, which serves as a common point of reference when generating the date/time and timecode values to be embedded in the AV streams and the timestamp values to be embedded in the Sensor streams. The Internal Clock 74 periodically produces a 'tick' (or 'jiffy') at a constant, sub-second rate. The number of 'tick's generated since the device has been powered on is tracked 76. The Reference Clock 86 is set by preserving the current value of the 'Tick' count 78, associating this value with a (Date, Time) pair 82, 80 and with a Timecode value 84, the latter suitably adjusted for the frame rate of the video capture device. The current value of (Date, Time) from the Reference Clock 86 is derived by applying the difference between the current 'Tick' count 76 and $Tick_0$ 78 to the ($Date_0$, $Time_0$) pair 82, 80 preserved when the Reference Clock was set. The current value of Timecode from the Reference Clock 86 is derived by applying the difference between the current 'Tick' count 76 and $Tick_0$ 78 to the $Timecode_0$ 84 preserved when the Reference Clock was set, again suitably adjusted for the frame rate of the video capture device. This style of timecode is often described as 'free-running'.

One skilled in the art will appreciate that "timecode" is standard in the industry and defined by the Society of Motion Picture and Television Engineers (SMPTE) in the SMPTE 12M-1, and SMPTE 12M-2 specifications. Timecode itself is a form of media metadata. Unique to this embodiment is the reformatting or normalizing of the embedded timecode in the AV stream so that it can be effectively synchronized with the timestamps in the sensor stream. An industry standard timecode may or may not be included in an AV file from a device capable of creating an AV file. In this embodiment, the Timecode needs to be correctly inserted or the existing Timecode needs to be extracted and replaced with values that are synchronized.

Figure 4:
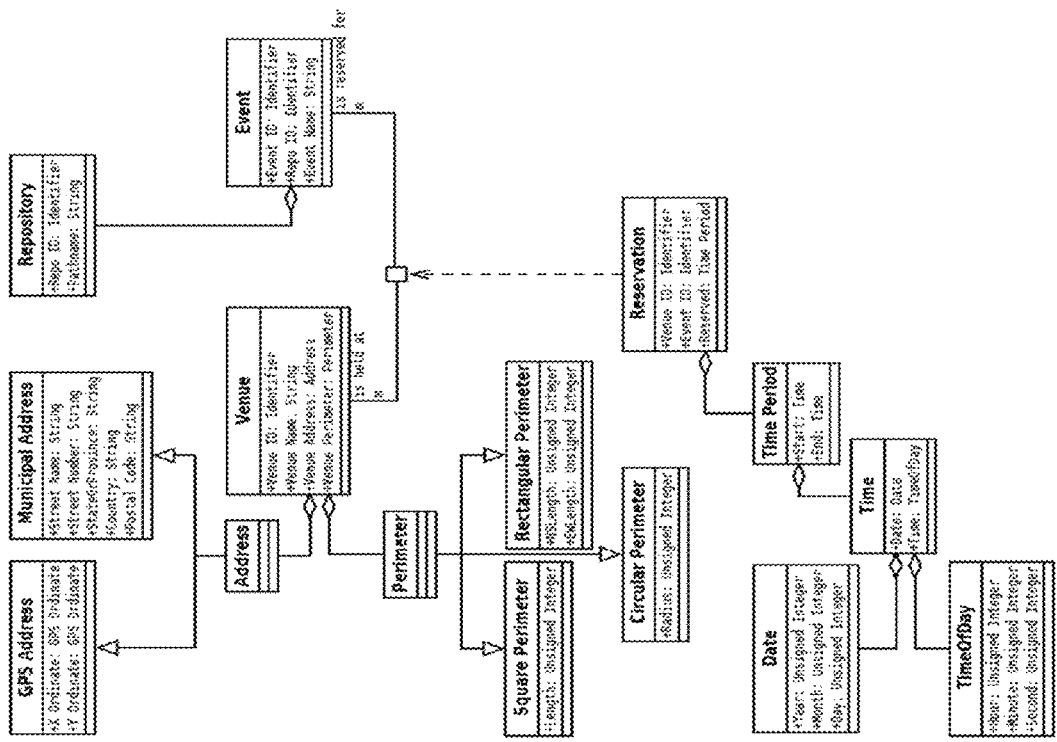
FIG. 4 is a block diagram to show data structure that may be used according to an embodiment of the invention.

FIG. 4 illustrates the different entities and their relationships as an object model describing a system whereby Events and Venues can be established/maintained and associations made between them for a specified period of time by means of a Reservation. The collection of reservations associated with an event is referred to as the event's timeline. The relationship between Venues and Events is Many-to-Many, described as "An Event is held at one or more Venues; a Venue is reserved for one or more Events." The association between Events and Venues is established through Reservations. A Reservation associates one Event and one Venue for the period of time specified.

Figure 5:
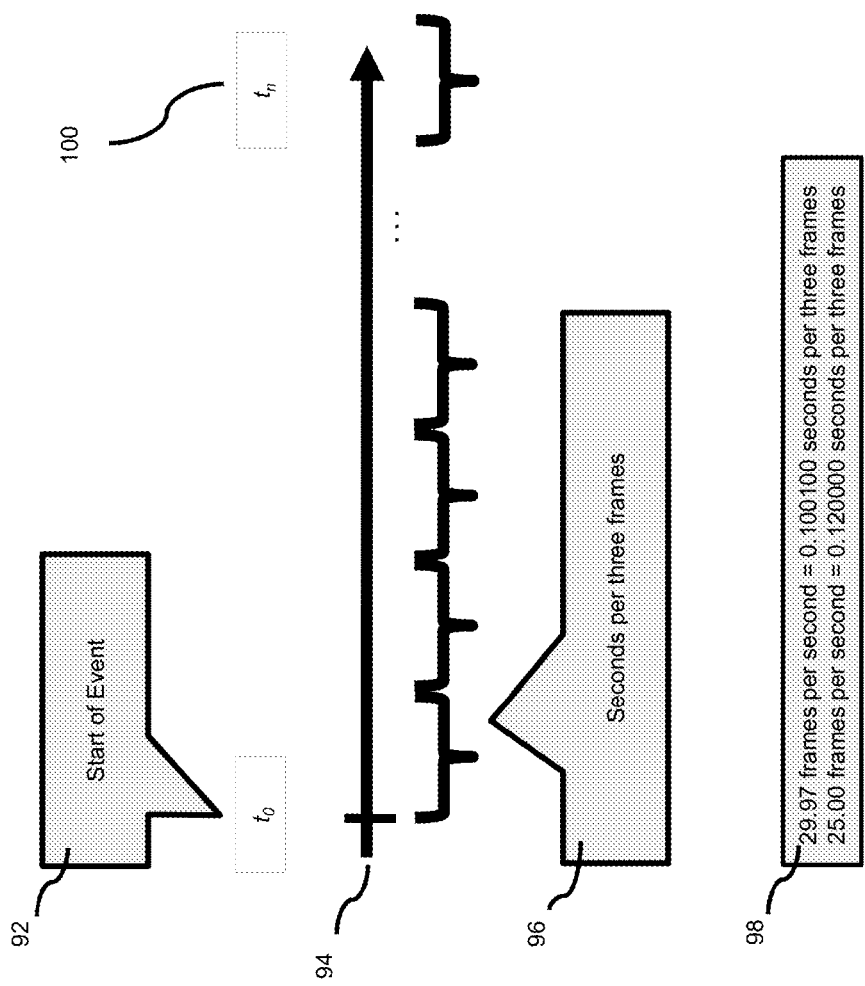
FIG. 5 is a diagram to show data structure that may be used according to an embodiment of the invention.

FIG. 5 illustrates a convention whereby a sequence of desired recording start/stop times are established relative to the beginning of an event's timeline. AV streams from "smart" video capture devices which are synchronized to the event's timeline achieve better interleaving when starting and stopping recording at the record transition points dictated by this convention.

The first record transition point $t_0$ 92 originates at the beginning of the event's timeline. The interval at which subsequent record transition points occur 96 is derived entirely from the frame rate (expressed as frames-per-second) value of a pending video recording. For computational convenience the interval established is the fraction of a second required for three frames 98; this is 0.120000 seconds for a frame rate of 25 FPS, and 0.100100 seconds for a frame rate of 29.97 FPS (where 29.97=(30×1000)/1001). These values are well within the precision of most clocks and avoid periodic corrections.

Figure 6:
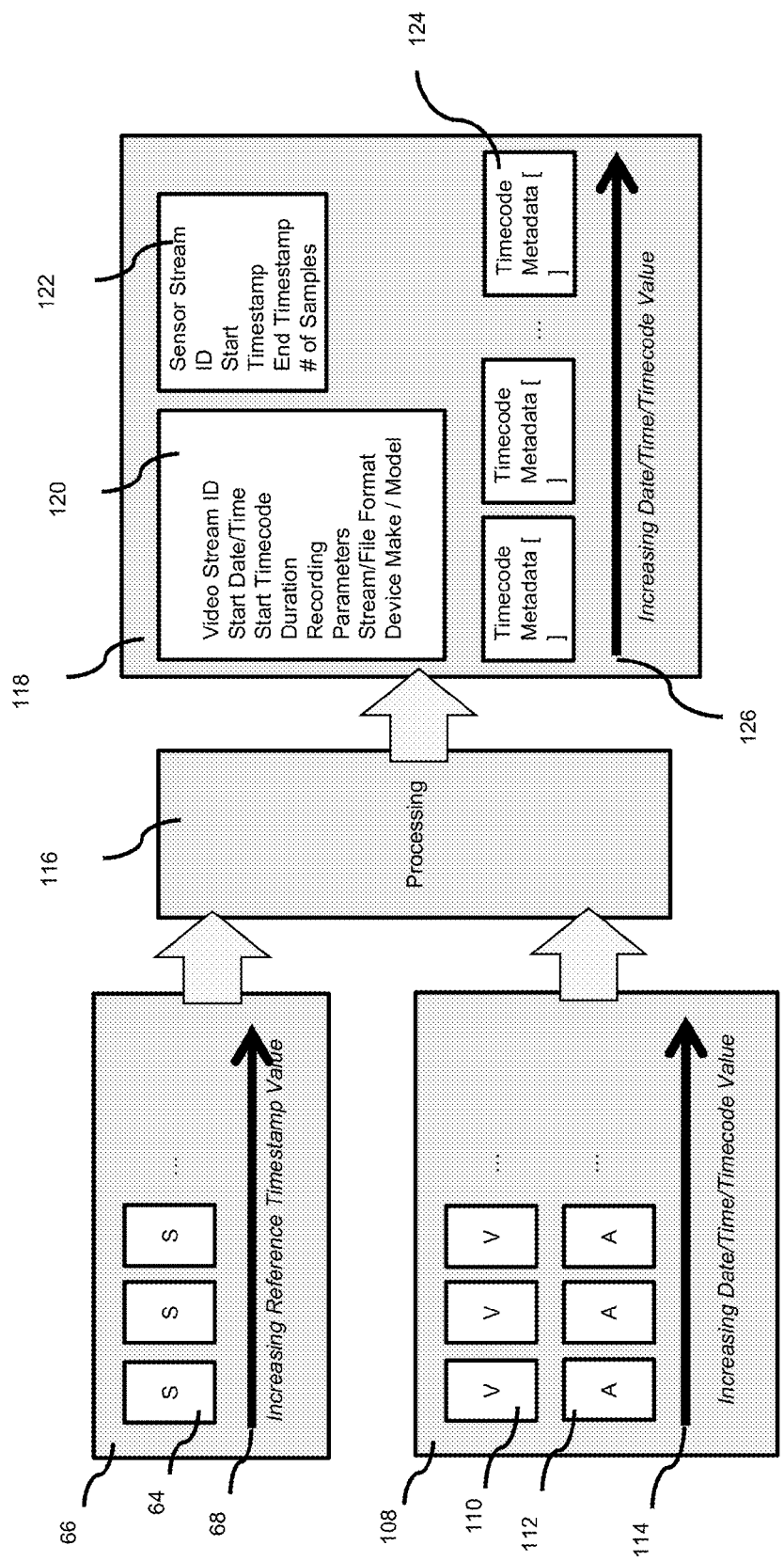
FIG. 6 is a block diagram to show data structure that may be used according to an embodiment of the invention.

FIG. 6 depicts the processing 116 of an AV stream 108 with its associated sensor stream 66 to create/maintain a set of organized metadata values 118. In one embodiment, a single AV stream and its associated sensor stream is processed to generate one or more sets of metadata referencing sequences of frames within the AV stream. The generated metadata may be relatively simpler (e.g. derived solely from the content of the sensor stream and some simple values obtained directly from the AV stream) or more relatively more complex (e.g. including analysis of the rendered content of the AV stream).

Relatively simple metadata obtained from the sensor stream might include any of a GPS coordinate and elevation of the device (a.k.a. location), a compass direction and inclination of the device (a.k.a. the line of sight), a rotation of the device about the line of sight, a direction and magnitude of acceleration of the device (i.e. steadiness), a focal length (distance to subject in focus), a zoom factor, and/or exposure (lighting levels).

Other relatively simple metadata is descriptive information that is device or user specific and that is not generally sensor-sourced or time-dependent. This might include any of the photographic capabilities of the device such as sensor resolution (number of pixels) and optical focal length, the device brand, device model, device serial number, device type or category, device operating system, and/or the owner's name or user name.

Derived metadata might include the location of the subject, derived geometrically from the location of the device, line of sight, and distance to subject in focus.

More complex metadata might be derived by analysis of the AV content and might include any of indications of motion, a scene change, the number of faces present, the number of voices present, a textual conversion of speech, locations of faces within a frame (or a list of the same), identifiers of faces (or a list of the same), identifiers of voices (or a list of the same), and/or text conversion of speech by voice (or a list of the same).

Other metadata may be associated with the AV stream and sensor stream in their entirety. Metadata associated with the AV stream might include any of the starting date/time, the starting timecode value, the duration (e.g. number of frames), the recording parameters (e.g. bit rate, frame rate, height and width, progressive/interlaced, encoding profile/level), and/or the stream/file format.

Metadata associated with the sensor stream might include any of the timestamp of the first sample set, the timestamp of the final sample set, the number of sample sets present, or the type(s) of sensor data present.

A more advanced embodiment of the invention would apply external relationships to define the memberships of a collection of AV/sensor streams (e.g. streams associated with a specific event and/or venue), and so create/derive/maintain additional metadata to support those relationships.

For example, one embodiment might create/maintain a catalog of voice recognition data from a collection of one or more AV streams. This catalog could be consulted to determine if a speaker is known or is new, the AV segments where that speaker's voice is in the audio segment, and if the speaker has been identified. Similarly the embodiment might create/maintain a catalog of facial recognition data from the same collection of AV streams. This catalog could then be consulted to determine if a figure is known (already appeared) or new, the AV segments in which that figure appears, and if the figure has been identified (already cataloged). In the case when there is only one speaker in the audio segment and one figure in the video segment, another embodiment of the invention will determine if the figure is doing the speaking or if the audio segment is a voice over. The speaker himself or herself or a familiar participant may identify the speaker/figure by listening/viewing the AV segments, and manually enter the speaker's or figure's common name into the catalog. This capability facilitates the automatic generation of cast member lists, credits, cross-reference of appearances, and subtitles with identifiers. Thus are established the relationships for providing results to queries such as:

[Include or exclude video segments where 'Uncle Jack' appears or speaks]

OR

[Include only 'Uncle Jack']

AND/OR

[Include or exclude video segments with the greatest or least number of faces]

AND/OR

[Include or exclude video segments with the greatest or least number of voices]

AND/OR

[Cycle among video segments shot from all compass directions]

AND/OR

[Give priority to video that is steady]

AND/OR

[Give priority to long segments]

AND/OR

[Insert list of speaker names]

In another embodiment, location and line-of-sight (where the device's camera is located, the direction it is pointing, and the camera's focal-length and thus angle of view) from one sensor stream can be compared with that from other sensor streams captured during the same time span to determine if the cameras' lines-of-sight intersect, indicating AV segments which may have been recording the same subject from different viewpoints.

In another embodiment, device location and line-of-sight may also be the basis for establishing if the recorded AV segment is within an acceptable sub-perimeter (i.e. of a venue), or within an excluded area within the venue. For example:

[Include video segments from "Venue Concert Stage"];
whereby "Venue Concert Stage" is defined to be the directional sector (angle of view) starting at the cardinal direction of North (N): 0°, 360° and clockwise through the ordinal direction of Northeast (NE): 45°. 57' 55"
AND/OR

[Exclude or video segments from "Venue Back Stage"];
whereby "Venue Back Stage" is defined to a 50 foot radius about the GPS location of 35° 57' 55" N, 79° 1' 31" W.

Embodiments of the invention may store metadata in various formats and representations (e.g. database tables, XML files, JSON) and may facilitate access through various interfaces.

Figure 7:
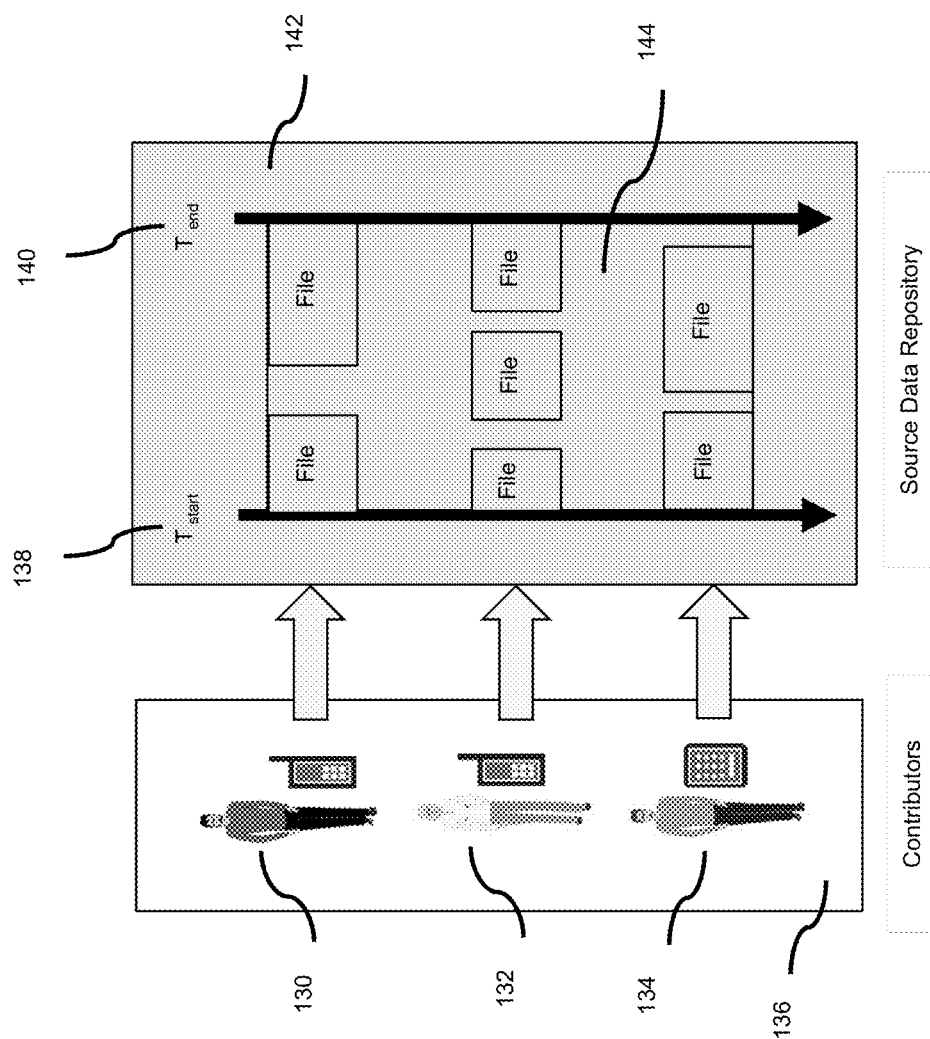
FIG. 7 is a block diagram to show how data are organized by contributor, location, and time that may be used according to an embodiment of the invention.

FIG. 7 illustrates as an overview a group of contributors 136, and composed of multiple individuals that are contributing by using a software application that is installed and operated on their respective mobile devices, 130, 132, and 134. Contributors 130, 132, and 134 produce files 144 and upload these to a Source Data repository 142 via an interface for receiving the individual digital media input from the contributor. These files are created after the time $T_{start}$ 138, and before the time $T_{end}$ 140. By processing the geospatial and other relevant sensor data coming from each contributor's mobile devices, the approximate location (to the accuracy of the sensors) of each contributor can be determined as can each of the contributor's audio and visual photographic perspective. The size of the group is not limited, and the amount of data is probabilistically determined. For example, User 130 may be contributing files while Users 132 and 134 are idle or the group may assume other activity combinations that each result in a positive flow of files from the group of contributors to the Source Data Repository 142, over some time interval.

Figure 8:
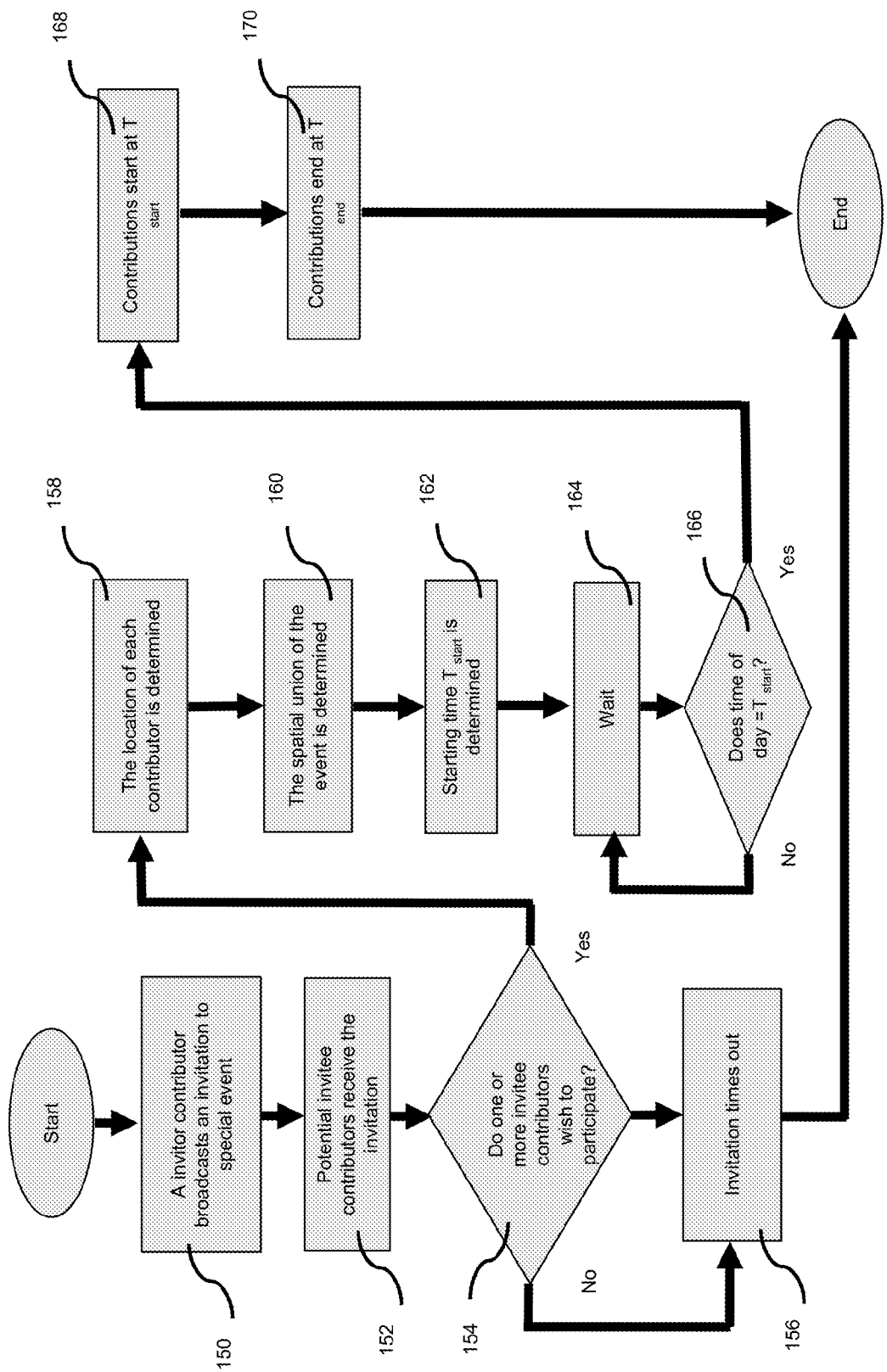
FIG. 8 is a flow diagram illustrating a method for the ad hoc formation of an event according to an embodiment of the invention.

FIG. 8 is a flow diagram illustrating the ad hoc process that results in the creation of a group of contributed files. In one embodiment, an inviter contributor 150 sends an invitation in the form of an electronic message to one of more potential invitee contributors 152. If one or more invitee contributors wish to contribute to the event, then the geospatial location of each contributor is polled 158 and the initial spatial union of the event is determined 160:

Event location=contributor 1 location∪contributor 2 location∪ . . . contributor N location;
whereby ∪=union of This 'cloud' of contributors is dynamic as the location of contributors changes, but it is assumed to remain in proximity to a live event or point of interest. Next a starting time, $T_{start}$ 162 is specified by the inviting contributor. When the actual time of day is equal to $T_{start}$ 166 the contributions start at $T_{start}$ 168. The contributions end at $T_{end}$ 170. The event is therefore defined by:

A time duration: =($T_{start}$ minus $T_{end}$)
A geospatial area: The union of the geospatial locations of all contributors
Participants: The list of all contributors If contributors do not wish to participate (154, No branch), then the Invitation times out, 156.

Figure 9:
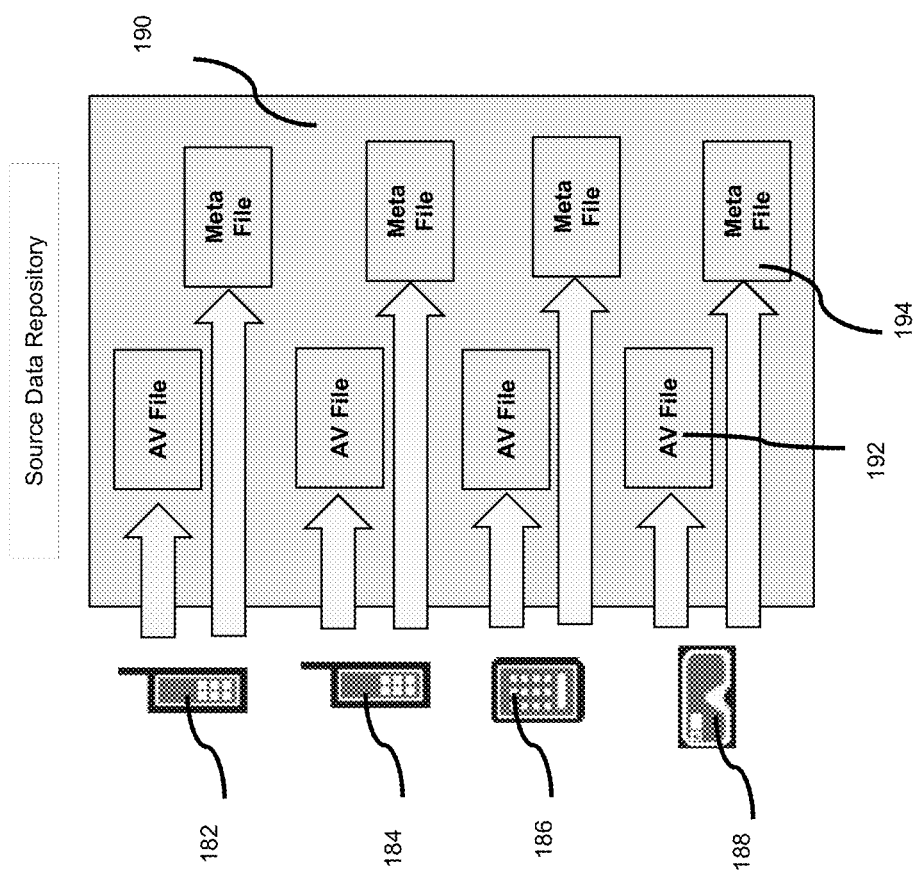
FIG. 9 is a block diagram of a system that may be used according to an embodiment of the invention.

FIG. 9 illustrates a block diagram of the Source Data Repository 190 that may be used in an embodiment of systems and methods for automatically editing and assembling digital media into digital media programs. This system includes a plurality of users with devices that produce files or source data. Shown are a smart mobile device 182, another smart mobile device 184, a tablet device 186, and a wearable computer with a camera 188. Generally individuals operating these devices connect and upload files of specific durations. The devices shown are each capable of recording and uploading digital media AV files 192, in addition to Meta Files 194. There are various embodiments of the structures of both of these files and they are device dependent, and a single source device 182, 184, 186, or 188 is capable of creating many AV files and Meta Files couplets at different times and of differing durations throughout operation. Thus, the Source Data Repository has at least an interface to accept the digital media information and the metadata associated with digital medial information. In one implementation, the files are transferred to the Source Data Repository by connection to the public Internet.

Figure 10:
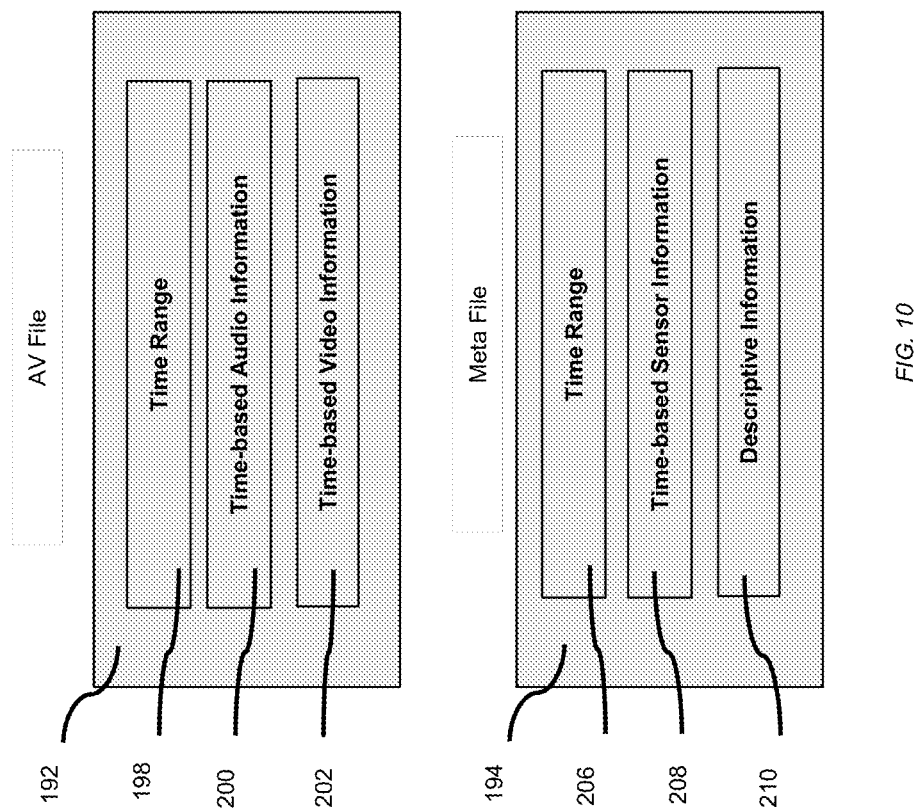
FIG. 10 is a block diagram to show the internal structure of files that may be used according to an embodiment of the invention

FIG. 10 illustrates a block diagram of both the AV File 192, and the Meta File 194. These two items are depicted together to show the similarity of their structure. A Time Range 198 defines the temporal bounds of AV File. The time range can be encoded into the file in several ways. One way is to have a specific time code data set or track, another way is to specify a starting, ending, and incremental time value, and a third and more implicit way is to have the time range be relative and its duration be computable from knowledge of the sampling structure, rate, and or AV File's file size. The essence of the AV File is the Time-based Audio Information 200, and Time-based Video Information 202. There are many suitable alternatives for the structure of this information, but the significance is that the information is a function of time and a sequential data representation of an event of reality.

Likewise, The Meta File 194 is composed of Time Range 206, which is correlated to Time Range 198. Rather than information obtained from Audio (microphone) or Video (camera), Time-based Sensor Information 208 has information obtained from the devices' non-AV sensors. Examples include but are not limited to ambient light, proximity, touch, position (including GPS, WiFi, Cellular, NFC, Bluetooth), accelerometer, magnetometer, fingerprint, gyroscope, humidity, pressure, camera choice, IMU, microphone choice, temperature, focus distance rate, battery remaining life, and zoom factor. There are many suitable alternatives for the structure of this information and the number of sensors per device is device dependent, but the significance is that the information is a function of time and a sequential representation of an event of reality. Sensor information is included for any time period up to the minimum sensitivity, signal to noise levels, and granularity limits of the device's sensor capability.

In addition, the Meta File may contain Descriptive information 210 that is device or user specific—that is generally not sensor-dependent and not time-dependent. Examples of this information could be the device brand and model name or technical specification such as photographic resolution.

It should be appreciated that the depiction of this file structure is general and different devices will have different audio, video, and sensor capabilities. Furthermore there are different technologies and/or mathematical compression algorithms that may be used solely or in combination to create or extract the expected Audio, Video, or Meta information.

Figure 11:
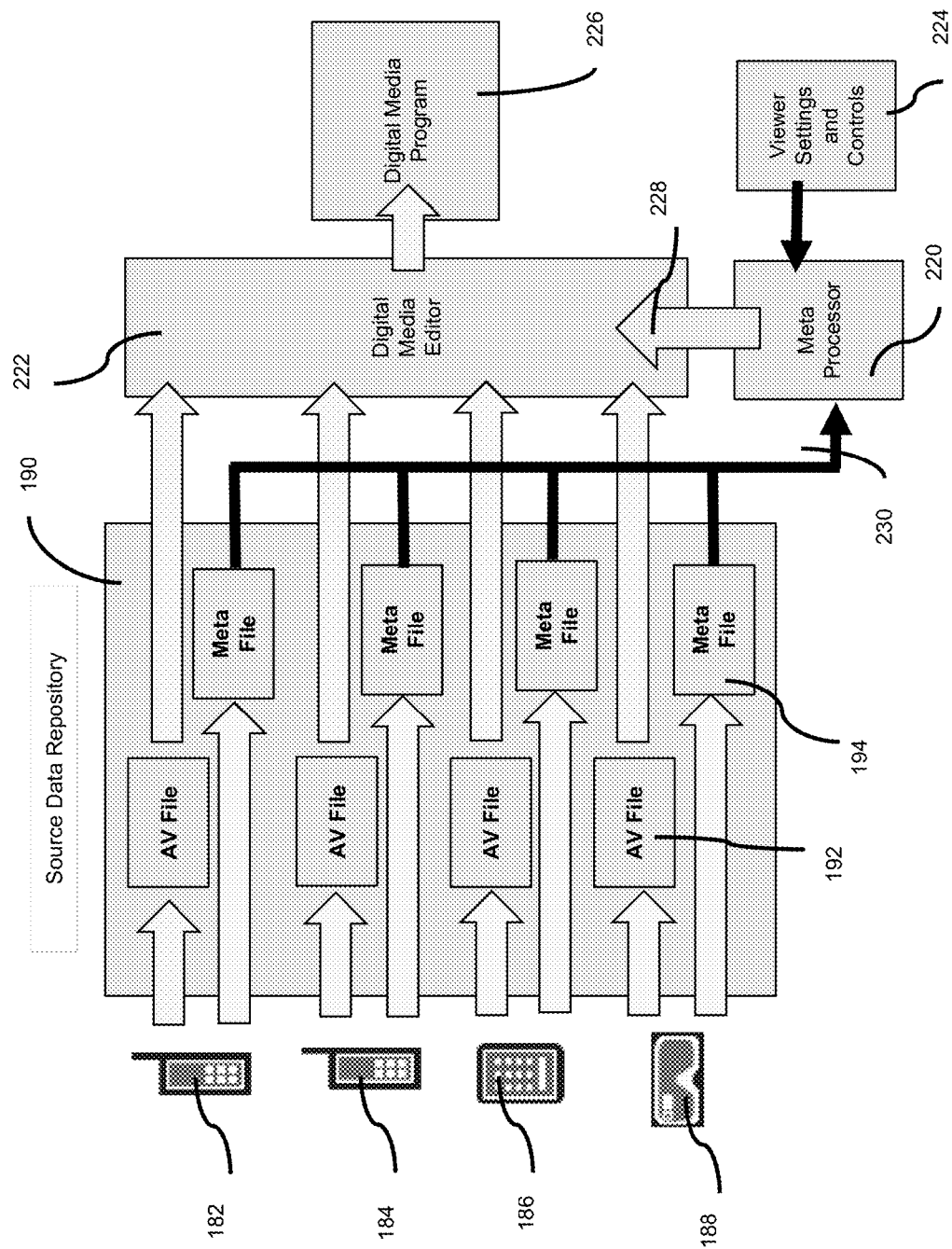
FIG. 11 is a block diagram of a system for processing AV Files and Meta Files that may be used according to an embodiment of the invention

FIG. 11 illustrates a block diagram to which is added blocks onto the Source Data Repository (FIG. 7). The Meta Processor 220, is a module that reads the source Meta Files for all interested periods of time and analyzes the metadata therein. The Meta Processor also accepts inputs in the form of Viewer Settings and Controls 224. The Meta Processor is a key block to this invention. The combined Meta File information has both static and dynamic value to the creation of a digital media program. For example, if the time range included the specific times from 13:00:00 to 13:01:00 Greenwich Mean Time on the 26th day of August in the year of 2014, then from these files, one minute of audio and video could be extracted and one minute (for each sensor) of correlated sensor information could be extracted. By referencing gyroscope or accelerometer data, it may be determined that the device's camera was oriented in the negative Z direction, or straight down. The conclusion might be that the video is not as highly ranked than the video from another device that was oriented forwards. Alternately, by referencing GPS data, it may be determined that the location is San Francisco, Calif., and the conclusion might be that this video should be ranked more highly than video obtained from the possibly less interesting location of Barstow, Calif. By referencing accelerometer data, it might be concluded that the stability of the video should be assigned a value of 8 on a scale of 0 to 10 (10 being most stable), and the conclusion might be that this video should be ranked more highly than video whose stability was assigned a value of 4, reflecting a belief held by some that steady video is superior to shaky video.

The extracted sensor information therefore contains information from which each corresponding AV File is ranked so editing decisions can be directly made after completing this analysis in multiple dimensions, whereby each sensor represents one dimension, as does the axis of real time. For example, the system could be programmed to Create Suggested Program by looking at this or another dimensional set of data:

[Device facing forward] AND
[Device facing northward] AND
[Device accelerometer >5] AND
[Device located in Copley Square, Boston, Mass., USA] AND
[Time range is 13:00:00 to 13:01:00 Greenwich Mean Time on the $26^{th}$ day of August in the year of 2014]

The existence of suitable AV Files or the AV Files "Rank" is a direct function of the degree that the AV File matches the programmed query. In the event that a perfect match isn't found, the Meta Processor can be programmed to alter and to resubmit the query until a suitable AV File is determined.

The conclusion of this analysis 228 becomes an input to a Digital Media Editor 222, which is a module that compiles selected portions of the AV Files, and forms the output of a Digital Media Program 226. There are various output interfaces (not shown) and methods for delivery of the Digital Media File including isochronous streaming, sending a link which grants access in any form to a digital media file or transferring (sharing) the Digital Media Program with an online video or social media platform.

It should be appreciated that the AV Files or segments are constructed or edited into a Digital Media Program 226 by the Digital Media Editor 222 and that the automatic selection, ranking, and sequencing of the digital media files is unique. The visual and/or auditory transitions between any sequential segments ("A, and B") are typically:

Dissolve A to B
Cut A to B
Wipe A to B; various directions or geometric shapes and patterns
Page Turn A to B
Flip A to B
Spin A to B
Fly in A over B
A Displaces B
A Rotates to B; clock transition
A Windowed over B
A and B as a split screen
A audio mixes to B audio
A audio cuts to B audio One skilled in the art will appreciate that various transitions are standard in the industry as digital video and audio effects, and rather it is the selection of the segments rather than the transitions that uniquely define the bulk of the program's content. Implementations of this invention automates the digital media editing subjective process—that of determining the best segment for any time period of the production's duration.

Although not shown in FIG. 11, in certain implementations, information from the AV Files, alone or in combination with information in the Meta Files, are passed to Meta Processor 220, Meta Processor 220 then derives metadata information about the AV content itself, as described in more detail above.

Figure 12:
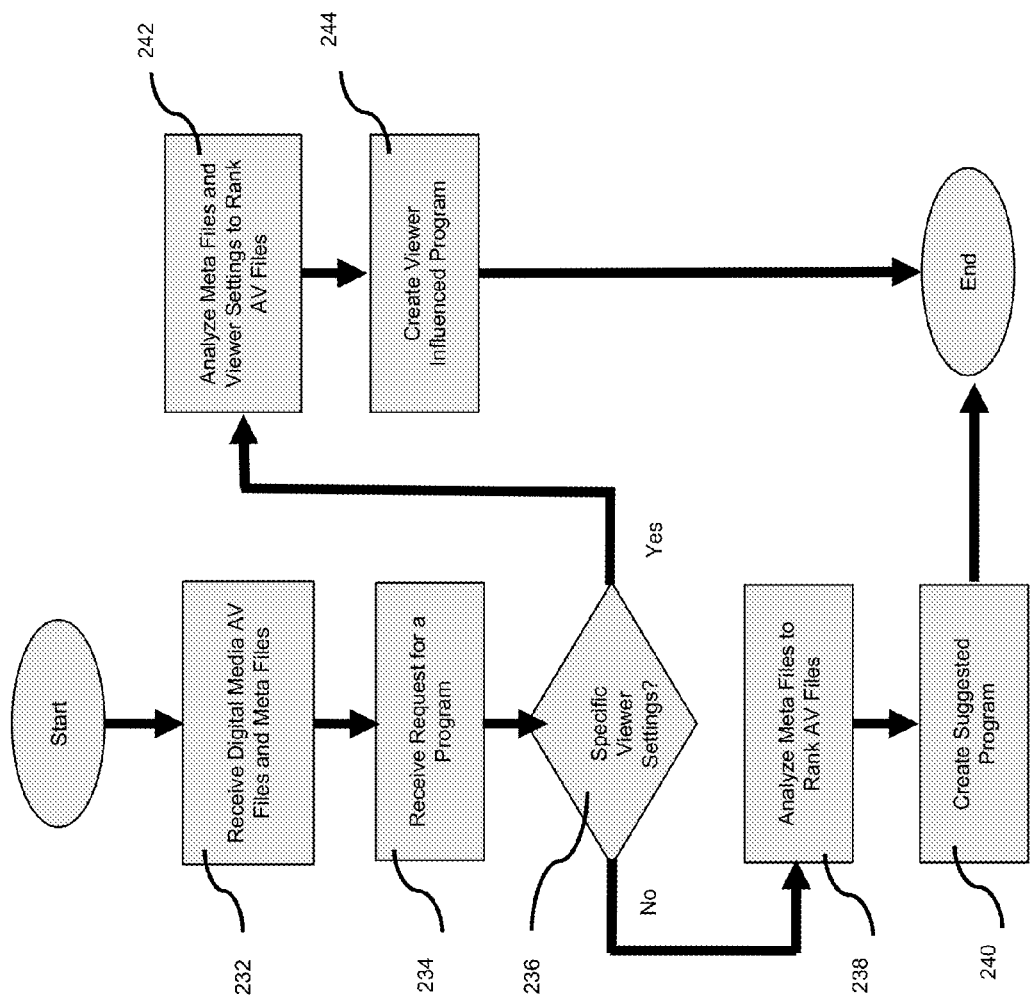
FIG. 12 is a flow diagram illustrating a method for performing data analysis according to an embodiment of the invention.

FIG. 12 is a flow diagram illustrating a method for Receiving Digital Media AV Files and Meta Files 232 according to an embodiment of the invention, which is prerequisite to processing. Asynchronously, but following, the next step is to Receive Request for a Program 234. This request may or may not include Specific Viewer Settings 236. For example, a viewer may specify that he/she prefers video that is shot steadily rather than shakily and this is provided as a computational parameter that applies a scaling or filtering factor to a device's accelerometer sensor data. In the alternative, aggregate preferences gathered from a large number of viewers can be applied in place of individual preferences. The systems and methods for automatically editing and assembling digital media into digital media programs, then begins to Analyze Meta Files to Rank AV Files 238 and then it will Create Suggested Program 240. In the case that the viewer does specify Specific Viewer Settings, the system will Analyze Meta Files and Viewer settings to Rank AV Files 242 to Create Viewer Influenced Program 244. The process is now complete and awaits the next Receive Request for a Program.

One user may request multiple programs, or multiple users may request programs. This flow process can be repeated multiple times, with each cycle possibly producing a unique program because at the time of each request there may be different contents in the Source Data Repository, and different Specific Viewer Settings.

Figure 13:
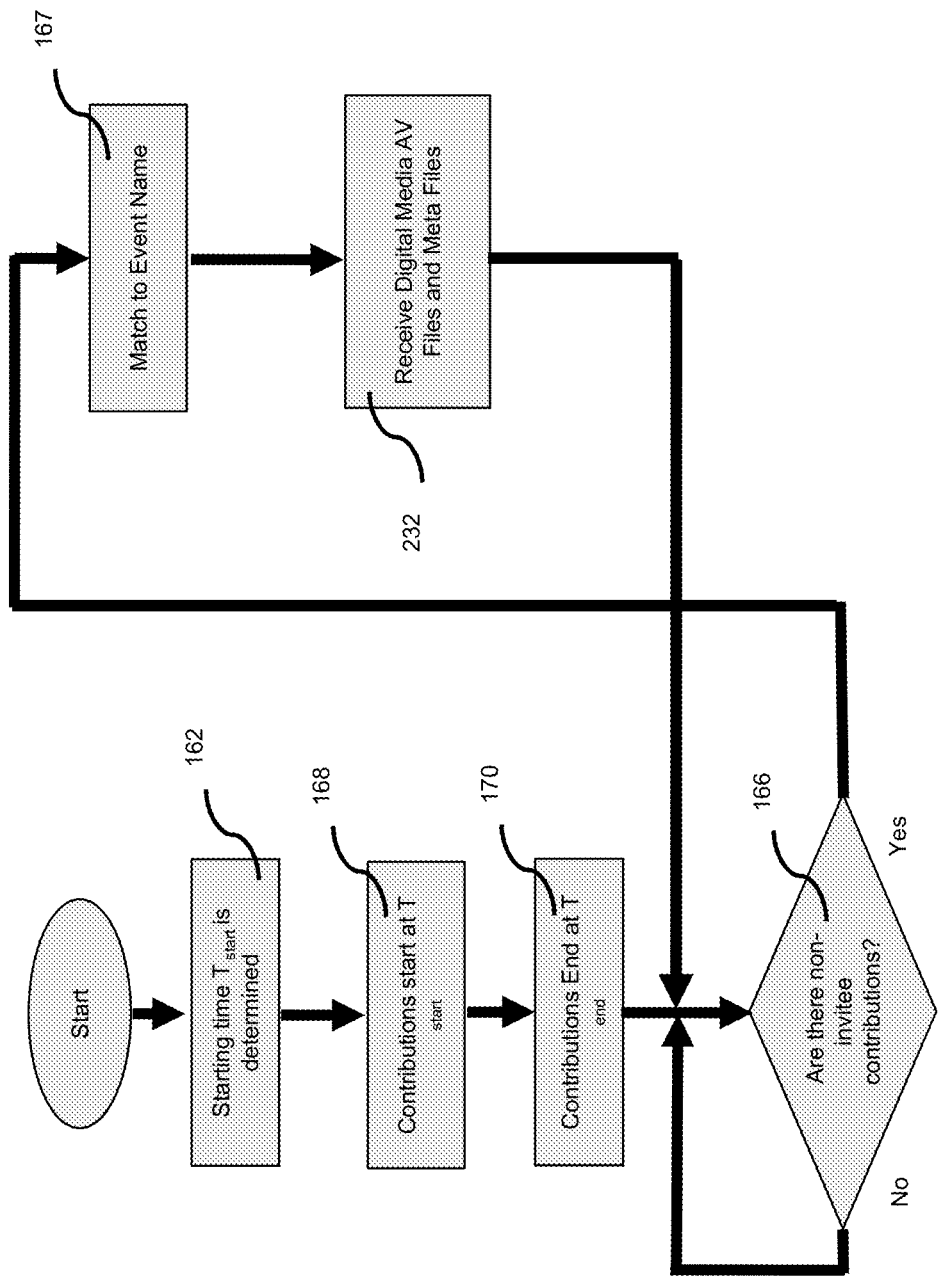
FIG. 13 is a flow diagram illustrating a method for performing data analysis according to an embodiment of the invention.

FIG. 13 is a flow diagram illustrating the ad hoc process that results in the creation of a group of contributed files. This is similar to the embodiment described in FIG. 8, which generally describes contributions between $T_{start}$ and $T_{end}$. In this embodiment, it is possible for non-invitees to contribute digital media, AV files and Meta files after time $T_{end}$. This flow diagram operates in an endless loop and monitors the Source Data Repository (Reference FIG. 11) by testing for the condition "Are there non-invitee contributions?" 166. If Yes, (166, Yes branch), these contributions are matched to the event name 167, so they can be associated with a unique event's collection of source data and received by the Source Data Repository 232. If No, (166, No branch), the embodiment continues to monitor until terminated. The endless flow diagram is drawn for the purpose of illustration. A practical embodiment will include external controls to initiate or terminate this process.

It should be appreciated therefore that the method of collecting AV files and Meta files does not require a networking system to be available at the time of the event itself. As described in FIG. 13, non-invitee contributors can attend the event, record information with a stand-alone software application that is installed and operated on the non-invitee contributors' mobile devices and then at a later time equal to ($T_{end}$+n), where n is an arbitrary period, upload digital media, AV files and Meta files, that may then be included in future programs.

Figure 14:
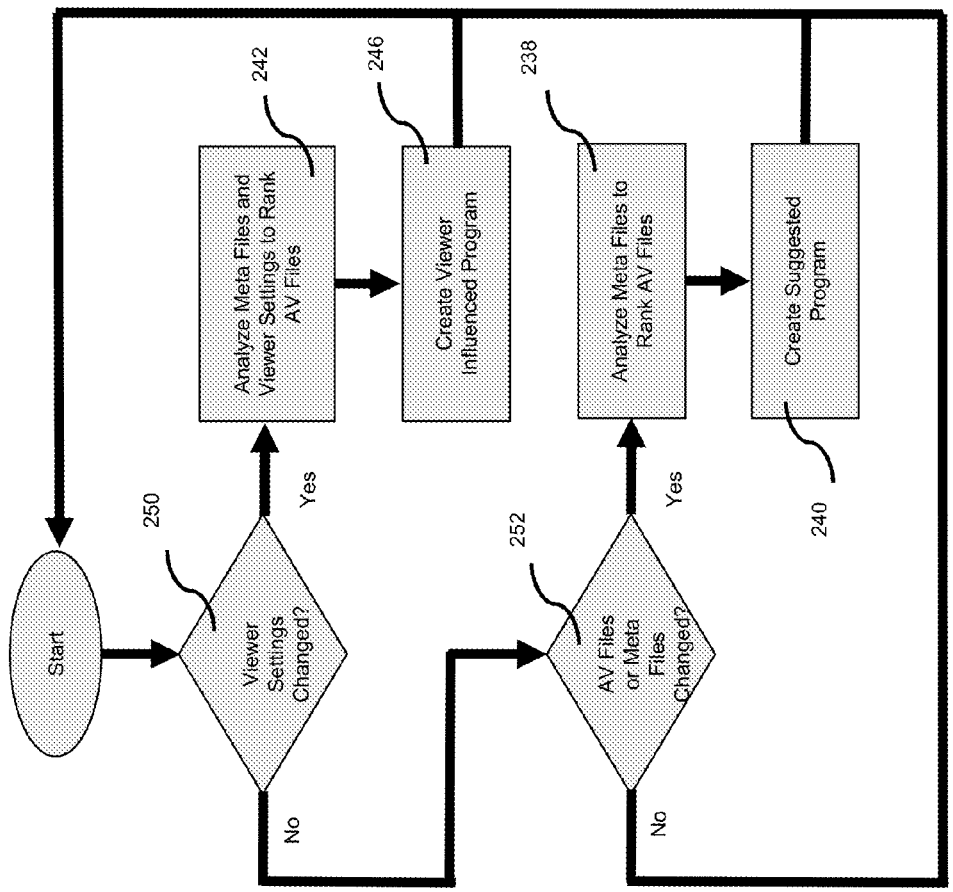
FIG. 14 is a flow diagram illustrating a method for performing data analysis according to an embodiment of the invention.

FIG. 14 is a flow diagram illustrating a method of monitoring the input data to Create Viewer Influenced Program 246 or Create Suggested Program 240. This flow diagram operates in an endless loop and monitors the Source Data Repository (Reference FIG. 11) by testing for the condition "AV Files or Meta Files Changed?" 252. It also monitors the Viewer Settings and Controls (Reference FIG. 11) by testing for the condition "Viewer Settings Changed?" 250. In each case, a viewer program is automatically created if the source conditions change. The endless flow diagram is drawn for the purpose of illustration. A practical embodiment will include external controls to initiate or terminate this process.

Figure 15:
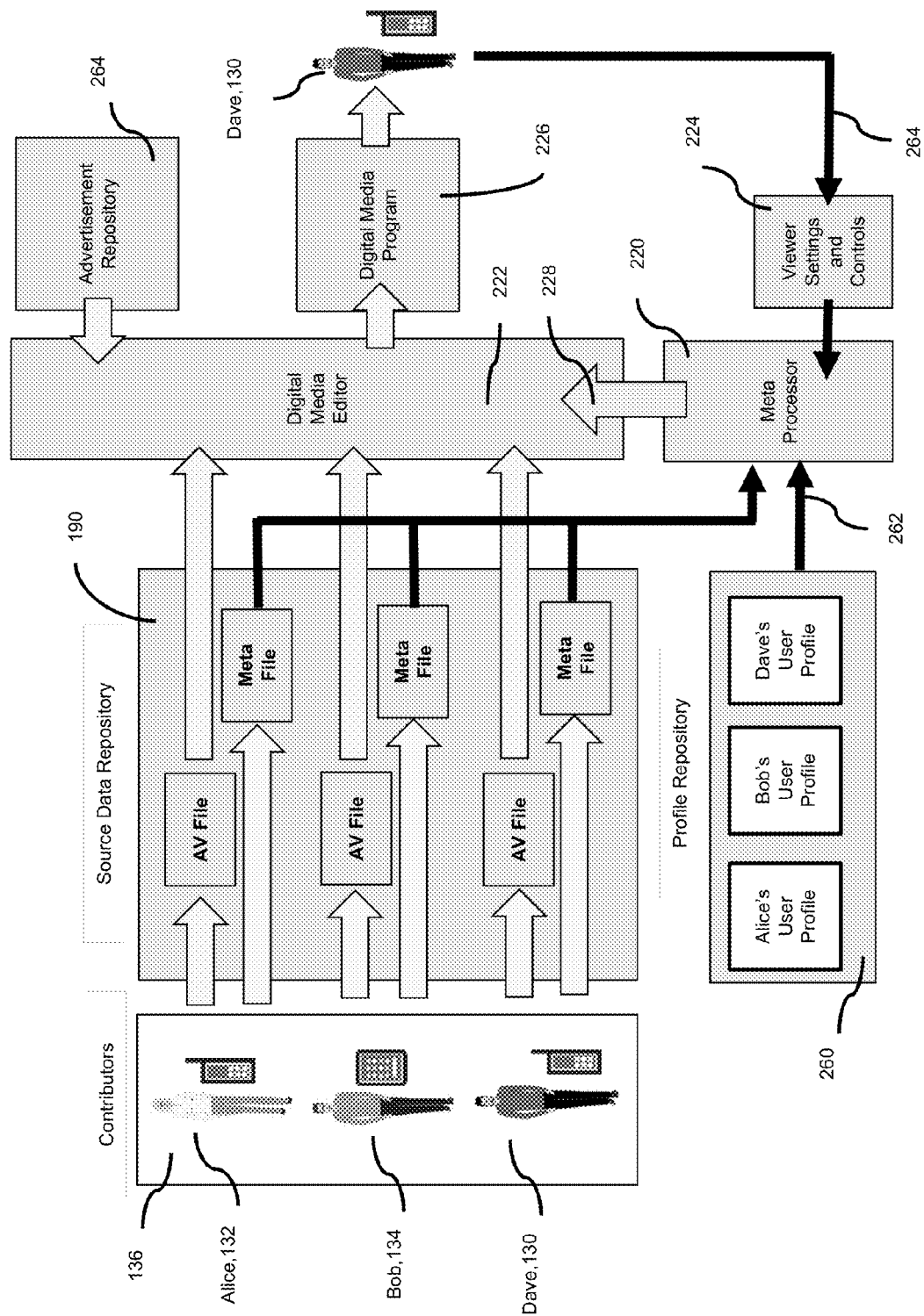
FIG. 15 is a block diagram of a system for processing AV Files and Meta Files that may be used according to an embodiment of the invention

FIG. 15 illustrates a block diagram to which is added blocks onto the Source Data Repository (FIG. 11) according to another embodiment of the invention. The new blocks are a Profile Repository 260, and an Advertisement Repository 264. Contributors 136 include Alice 132, Bob 134, and Dave 130, and a corresponding profile for each user is stored in the Profile Repository. As shown, Dave 130 is requesting a Viewer Influenced Program ("Dave's Program"), as described in FIGS. 11 and 12. In this embodiment, the Profile Repository 260 can serve as an additional input 262 to the Meta Processor 220. For example, Dave's User Profile may contain the information, "Dave is user Bob's friend", and this fact can be used by the Meta Processor as computational information that is input 228 to the Digital Media Editor 222. The Meta Processor may conclude to use more duration of Bob's contributed digital media and less duration of Alice's in the creation of Dave's Program and thus are established the relationships for providing results to Viewer Settings and Controls selections such:

[Include video segments from all contributors]
OR
[Include video segments from friends]
OR
[Include video segments from family]
OR
[Include video segments from friends and family]
OR
[Include video segments from Alice]

In this embodiment, the Advertisement Repository 264 also contains digital media files or links to commercial product or services advertisements. Other companies provide these advertisement files or links to files and they also provide attributes describing each advertisement. In other embodiments, an advertisement can be a commercial product advertisement, information commercials, public service announcements or a general announcement about the status of the program or its participants.

In this embodiment, the Meta Processor can analyze and conclude which advertisement(s) should be included into which program and this can be done down to the granularity of the interests of contributors and viewers. For example, Dave's User Profile can be used to provide the best match advertisement for Dave. In this example, Dave's User Profile may contain this information:

Dave is user Bob's friend
AND
Dave lives in Chicago, Ill.
AND
Bob lives in San Francisco, Calif.

The Meta Processor may therefore conclude that an advertisement about airline flight specials between Chicago and San Francisco might be of interest to Dave. Rather than the advertisements creating an abrupt content break, the Meta Processor can specify that the advertisements be inserted at the best starting points in time. These points are specifically planned breaks in the program or at a points in time that are void of contributed digital media AV files, and one that will benefit from a filler AV file segment in the form of a commercial product advertisement, information commercials, public service announcements, or a general announcement about the status of the program or its participants.

Figure 16:
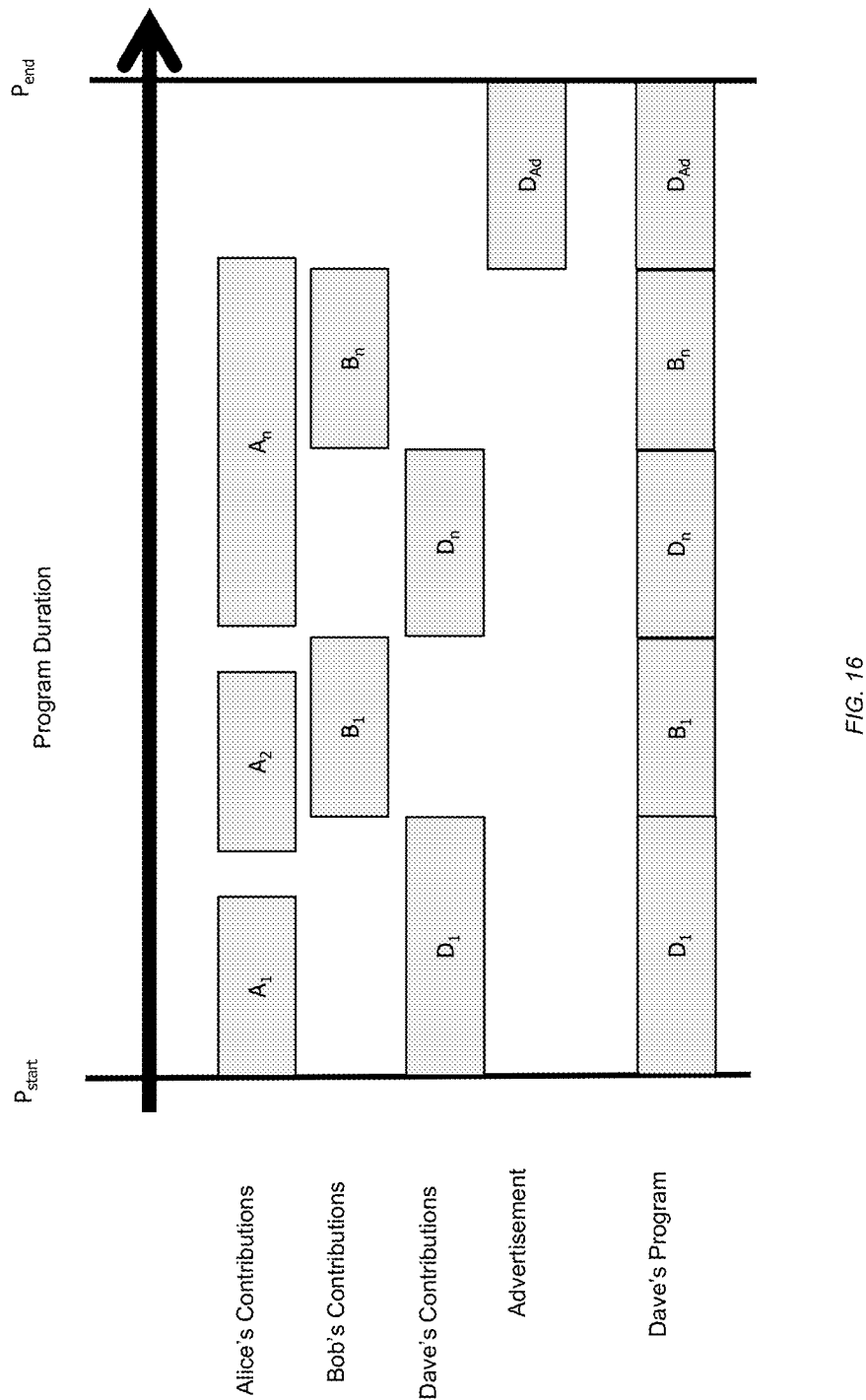
FIG. 16 is a diagram to show program sequence that may be used according to an embodiment of the invention.

FIG. 16 is a diagram showing an example program sequence that may be used according to an embodiment of the invention. Illustrated is the timeline of a Viewer Influenced Program requested by Dave ("Dave's Program"). The Program Duration is bounded by the time $P_{start}$ and $P_{end}$. Alice's Contributions are media segments $A_1$ through $A_n$. Bob's Contributions are media segments $B_1$ through B. Dave's Contributions are media segments $D_1$ through $D_n$. There is also an advertisement $D_{Ad}$, determined to be a match for Dave as per Dave's User Profile. In this case the instructions from the Meta Processor, FIG. 15 220 to the Digital Media editor, FIG. 15 222 would be to assemble Dave's Program, which is to be composed of the sequence set containing, $D_1$ through $D_n$, $B_1$ through $B_n$, and $D_{ad}$. It should be appreciated that Bob's Contributions have been favored over Alice's contributions since Dave's User Profile contains the information, "Dave is user Bob's friend". Further, since Dave and Bob are friends, there is a much higher chance that Bob's contributions may contain subject matter of high interest to Dave, such as Dave's children that Alice's contributions may not contain, which in turn produces a superior program for Dave.

Various patterns can be used to cycle among contributors. A round-robin pattern can be used so that the next contributor is always different from the previous contributor. A statistical pattern can be used such that there is a balanced time duration from each contributor between $P_{start}$ and $P_{end}$. A random pattern can be used such that there is a random distribution of all contributors. Other patterns can be used to maintain an interesting variety of contributors which in turn yields unique production styles. Together patterns, social factors, iterative viewer feedback, advertisement placements, and sensor-based rankings are mathematically blended to yield a unique and optimized program sequence.

The techniques and systems disclosed herein may be implemented as a computer program product for use with a computer system or computerized electronic device. Such implementations may include a series of computer instructions, or logic, fixed either on a tangible/non-transitory medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, computer instructions for implementing embodiments of the invention can be executed in wide variety of hardware systems. For example, a lone computer can perform all of the steps of a process or house all of the instructions for performing the functions described herein. Also, the functions can be spread across any number of computers having single or multiple processors. Although a process executing a set of instructions to accomplish a particular function or set of functions may be called a "module" herein, it is understood that such description does not limit a particular module to a single-processor implementation. Thus, for example, certain embodiments can be implemented across a collections of computers (e.g., a server cluster). Similarly, databases, digital catalogs, and the like can reside on one computer or across many computer/storage systems.

Further still, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein.

What is claimed is:

1. A system for analysis of individual digital media inputs and automated compilation of a digital media program, the system comprising:
    a digital media interface that receives an individual digital media input, the individual digital media input including at least one of audio and video information and associated temporal information captured by a recording device;
    a metadata interface that receives digital device metadata associated with the individual digital media input, the digital metadata including at least (i) information derived from at least one sensor of the recording device that characterizes a physical attribute of the recording device at the time said recording device captured the individual digital media input, and (ii) information temporally associating the sensor data with the individual digital media input;
    a source data repository that stores the information of the individual digital media input and associated digital device metadata;
    a preference interface that receives media characteristic preference information;
    a metadata analyzer module that analyzes digital device metadata associated with individual digital media inputs from at least two different recording devices, the digital media inputs having at least one temporally overlapping portion, and the metadata analyzer module selecting between the overlapping portions based on comparing digital device metadata associated with the individual digital media inputs with the media characteristic preference information;
    a digital media editor module that compiles the selected portions of the individual digital media inputs into a digital media program;
    an output interface that provides access to the digital media program.

2. The system of claim 1, wherein the information derived from the at least one sensor of the recording device includes at least one of geospatial coordinates of the recording device, an elevation of the recording device, a compass direction of a camera of the recording device, an inclination of a camera of the recording device, a rotation of the recording device about a line of sight, a direction and magnitude of acceleration of the recording device, a focal length of a camera of the recording device, a zoom factor of a camera of the recording device, and lighting levels detected by the recording device.

3. The system of claim 1, the metadata analyzer module further for deriving an estimated location of a subject of the captured video information, based on the information derived from the sensors of the recording device including a geospatial location of the recording device, a line of sight of a camera of the recording device, and an estimated distance to said subject.

4. The system of claim 1, the metadata analyzer module further for deriving digital content metadata based on the individual media input, the digital content metadata including at least one of indications of motion, a scene change, a count of faces present, a count of voices present, a textual conversion of speech, a location of a face, an identification of a face, and an identification of a voice.

5. The system of claim 1, the metadata analyzer module further for deriving digital content metadata based on the individual media input, the digital content metadata including at least one of a starting date/time of the individual media input, a starting timecode value of the individual media input, a duration of the individual media input, a number of frames of the individual media input, a bit rate of the individual media input, a frame rate of the individual media input, a height and width of the individual media input, an encoding profile of the individual media input, and digital format of the individual media input.

6. The system of claim 1, the metadata interface further receiving further metadata from the recording device including at least one of a sensor resolution of a camera of the recording device, an optical focal length of a camera of the recording device, a brand of the recording device, a model identifier of the recording device, a serial number of the recording device, a type or category of the recording device, an operating system identifier of the recording device, and a user identifier of the recording device.

7. The system of claim 1, the media characteristic preference information including information that describes preferences of a particular user of the system.

8. The system of claim 7, the preferences of the particular user of the system being learned based on monitoring interactions between the particular user and the system.

9. The system of claim 1, the media characteristic preference information including information that describes aggregate preferences of a plurality of users of the system.

10. The system of claim 1, further comprising a profile repository that stores relationship information about a plurality of users, the metadata analyzer module selecting portions of the individual digital media inputs from the different recording devices for inclusion in the digital media program based on the relationship information and an identification of which users are associated with the individual digital media inputs.

11. The system of claim 1, further comprising a profile repository that stores information about a plurality of users and an advertisement repository that stores advertisement segments and associated metadata describing the advertisement content, the metadata analyzer module selecting advertisement segments for inclusion in the digital media program based on a designation of a particular user of the plurality and a comparison of the information about the particular user from the profile repository and the metadata associated with the advertisement segments.

12. A computer system-implemented method of analyzing individual digital media inputs and automating compilation of a digital media program, the method comprising:
   receiving, at a computer system, an individual digital media input, the individual digital media input including at least one of audio and video information and associated temporal information captured by a recording device;
   receiving, at the computer system, digital device metadata associated with the individual digital media input, the digital metadata including at least (i) information derived from at least one sensor of the recording device that characterizes a physical attribute of the recording device at the time said recording device captured the individual digital media input, and (ii) information temporally associating the sensor data with the individual digital media input;
   storing in a computer-readable format the information of the individual digital media input and associated digital device metadata;
   receiving, at the computer system, media characteristic preference information;
   analyzing, at the computer system, digital device metadata associated with individual digital media inputs from at least two different recording devices, the digital media inputs having at least one temporally overlapping portion, and selecting, at the computer system, between the overlapping portions based on comparing digital device metadata associated with the individual digital media inputs with the media characteristic preference information;
   compiling, at the computer system, the selected portions of the individual digital media inputs into a digital media program;
   providing access, at the computer system, to the digital media program.

13. The method of claim 12, wherein the information derived from the at least one sensor of the recording device includes at least one of geospatial coordinates of the recording device, an elevation of the recording device, a compass direction of a camera of the recording device, an inclination of a camera of the recording device, a rotation of the recording device about a line of sight, a direction and magnitude of acceleration of the recording device, a focal length of a camera of the recording device, a zoom factor of a camera of the recording device, and lighting levels detected by the recording device.

14. The method of claim 12, further comprising deriving, at the computer system, an estimated location of a subject of the captured video information, based on the information derived from the sensors of the recording device including a geospatial location of the recording device, a line of sight of a camera of the recording device, and an estimated distance to said subject.

15. The method of claim 12, further comprising deriving, at the computer system, digital content metadata based on the individual media input, the digital content metadata including at least one of indications of motion, a scene change, a count of faces present, a count of voices present, a textual conversion of speech, a location of a face, an identification of a face, and an identification of a voice.

16. The method of claim 12, further comprising deriving, at the computer system, digital content metadata based on the individual media input, the digital content metadata including at least one of a starting date/time of the individual media input, a starting timecode value of the individual media input, a duration of the individual media input, a number of frames of the individual media input, a bit rate of the individual media input, a frame rate of the individual media input, a height and width of the individual media input, an encoding profile of the individual media input, and digital format of the individual media input.

17. The method of claim 12, further comprising receiving, at the computer system, further metadata from the recording device including at least one of a sensor resolution of a camera of the recording device, an optical focal length of a camera of the recording device, a brand of the recording device, a model identifier of the recording device, a serial number of the recording device, a type or category of the recording device, an operating system identifier of the recording device, and a user identifier of the recording device.

18. The method of claim 12, the media characteristic preference information including information that describes preferences of a particular user of the system.

19. The method of claim 18, further comprising learning, at the computer system, the preferences of the particular user based on monitoring interactions between the particular user and a digital media compilation system.

20. The method of claim 12, the media characteristic preference information including information that describes aggregate preferences of a plurality of users of the system.

21. The method of claim 12, further comprising:
   storing in a computer-readable format relationship information about a plurality of users; and
   selecting, at the computer system, portions of the individual digital media inputs from the different recording devices for inclusion in the digital media program based on the relationship information and an identification of which users are associated with the individual digital media inputs.

22. The method of claim 12, further comprising:
   storing in a computer-readable format information about a plurality of users and an advertisement repository that stores advertisement segments and associated metadata describing the advertisement content; and
   selecting, at the computer system, advertisement segments for inclusion in the digital media program based on a designation of a particular user of the plurality and a comparison of the information about the particular user from the profile repository and the metadata associated with the advertisement segments.

* * * * *